United States Patent
Kobayashi

(10) Patent No.: US 8,253,391 B2
(45) Date of Patent: Aug. 28, 2012

(54) CAPACITOR CHARGING APPARATUS

(75) Inventor: Shinya Kobayashi, Kyoto (JP)

(73) Assignee: Rohm Co., Ltd. (JP)

( * ) Notice: Subject to any disclaimer, the term of this patent is extended or adjusted under 35 U.S.C. 154(b) by 475 days.

(21) Appl. No.: 12/471,038

(22) Filed: May 22, 2009

(65) Prior Publication Data

US 2009/0289567 A1   Nov. 26, 2009

(30) Foreign Application Priority Data

May 22, 2008   (JP) ................................. 2008-134829

(51) Int. Cl.
*H02J 7/00* (2006.01)
*H05B 37/00* (2006.01)

(52) U.S. Cl. ........ 320/166; 320/134; 320/136; 315/219; 315/239; 315/240; 315/291

(58) Field of Classification Search ............. 315/209 R, 315/219, 224, 225, 246, 247, 291, 294, 297, 315/307, 308; 320/166, 134, 136
See application file for complete search history.

(56) References Cited

U.S. PATENT DOCUMENTS

| | | | | |
|---|---|---|---|---|
| 3,405,998 A * | 10/1968 | Walbridge | ....................... | 431/25 |
| 4,616,174 A * | 10/1986 | Jorgensen | ................. | 324/117 R |
| 4,787,020 A * | 11/1988 | Hiramatsu et al. | .............. | 363/20 |
| 6,518,733 B1 | 2/2003 | Schenkel et al. | | |
| 6,636,021 B2 * | 10/2003 | Schenkel et al. | .............. | 320/166 |
| 2004/0136206 A1* | 7/2004 | Kinoshita et al. | ................ | 363/16 |
| 2005/0237032 A1* | 10/2005 | Tan et al. | ....................... | 320/166 |
| 2006/0033477 A1* | 2/2006 | Lee et al. | ....................... | 320/166 |
| 2007/0132404 A1* | 6/2007 | Tamegai et al. | ................ | 315/291 |

FOREIGN PATENT DOCUMENTS

JP    2003-79147 A    3/2003

* cited by examiner

*Primary Examiner* — Douglas W Owens
*Assistant Examiner* — Thai Pham
(74) *Attorney, Agent, or Firm* — Cantor Colburn LLP

(57) ABSTRACT

A capacitor charging apparatus includes a transformer and an output capacitor which is to be charged using the current that flows through the secondary coil of the transformer. A control circuit charges the output capacitor by controlling the switching operation of a switching transistor provided on a path of the primary coil of the transformer. A voltage monitoring terminal is connected to a tap provided to the secondary coil of the transformer. A switching control unit receives a monitoring voltage that occurs at the voltage monitoring terminal, and controls the switching operation of the switching transistor according to the monitoring voltage. A protection circuit monitors the monitoring voltage. In a case in which continues to be satisfied with respect to the monitoring voltage, the switching control operation of the switching control unit for the switching transistor is stopped.

11 Claims, 4 Drawing Sheets

CAPACITOR CHARGING APPARATUS

BACKGROUND OF THE INVENTION

1. Field of the Invention

The present invention relates to a switching power supply, and particularly to a capacitor charging apparatus which generates high voltage by charging a capacitor.

2. Description of the Related Art

For the purpose of generating higher voltage than the input voltage, step-up switching power supplies are widely used in various electronic devices. Such a step-up switching regulator includes a switching element and a transformer. With such an arrangement, the switching element is turned on and off in a time shared manner so as to generate back electromotive force in the transformer, thereby charging an output capacitor with the current that flows through the secondary coil of the transformer. Thus, the input voltage is boosted and output.

The input voltage is applied to one terminal of the primary coil of the transformer, and the other terminal is connected to the switching element. The voltage applied to one terminal of the secondary coil of the transformer is set to a fixed voltage, and the other terminal thereof is connected to the output capacitor via a rectifier diode.

With such a switching regulator, when the switching element (switching transistor) is turned on, current flows through the primary line of the transformer, thereby storing energy in the transformer. Subsequently, when the switching transistor is turned off, on the secondary side of the transformer, the energy stored in the transformer is transferred to the output capacitor via the rectifier diode as a charging current, thereby charging the output capacitor. The output capacitor is charged by repeatedly performing the ON/OFF operation of the switching transistor, thereby raising the output voltage.

For example, Patent documents 1 through 3 disclose control circuits for a self-exciting capacitor charging apparatus, which monitor the state of the primary line or the secondary line of a transformer, and control the ON/OFF operation of a switching transistor according to the state thus monitored.
[Patent Document 1]
  Japanese Patent Application Laid Open No. 2003-79147
[Patent Document 2]
  U.S. Pat. No. 6,518,733
[Patent Document 3]
  U.S. Pat. No. 6,636,021

In some cases, the capacitor charging circuit controls the circuit operation according to the output voltage that occurs at the output capacitor. For example, judgment of whether or not an output voltage sufficient to drive the load has been generated, i.e., full-charge detection, is made by monitoring the output voltage. For example, with an arrangement disclosed in the aforementioned Patent document 1, the output voltage is indirectly monitored by monitoring the voltage across the primary coil of the transformer, thereby detecting full-charge.

However, the relation between the voltage across the primary coil and the output voltage changes according to the transformer winding ratio and so forth, leading to difficulty in detecting the output voltage with high precision. As a result, in some cases, there is a problem in that a driving voltage sufficient to drive the load cannot be obtained, or a problem in that an overcharge state occurs in which a charging operation is performed that exceeds the necessary voltage, leading to excessive power consumption.

Furthermore, in a case of directly monitoring the output voltage that occurs at the output capacitor after the output voltage is a divided by resistor, there is a need to employ a high-voltage resistor element. It is difficult to provide such a high-voltage resistor element within an LSI in the form of a built-in element. That is to say, there is a need to provide such a high-voltage resistor element in the form of a chip element, leading to an increased number of circuit components and an increased packaging area. Furthermore, in some cases, there is a need to provide a reverse diode so as to prevent the charge stored in the output capacitor from being discharged to the ground.

SUMMARY OF THE INVENTION

The present invention has been made in order to solve such problems. Accordingly, it is a general purpose of the present invention to provide a capacitor charging apparatus which is capable of detecting the output voltage with high precision using a simple circuit configuration.

An embodiment of the present invention relates to a control circuit for a capacitor charging apparatus which includes a transformer and an output capacitor which is charged with electric current that flows through a secondary coil of the transformer, and which charges the output capacitor by controlling the switching operation of a switching transistor provided on a path of a primary coil of the transformer. The control circuit includes: a voltage monitoring terminal connected to a tap provided to the secondary coil of the transformer; a switching control unit which receives a monitoring voltage that occurs at the voltage monitoring terminal, and which controls the switching operation of the switching transistor according to the monitoring voltage; and a protection circuit which monitors the monitoring voltage, and which stops the switching control operation of the switching control unit for the switching transistor in a case in which a predetermined condition continues to be satisfied with respect to the monitoring voltage for a predetermined period of time.

A voltage that corresponds to the output voltage that occurs at the capacitor can be detected with high precision by monitoring the electric potential at a tap provided to the secondary coil of the transformer. Furthermore, the position of the tap is set on the ground side of the secondary coil, i.e., the lower-voltage side thereof. Accordingly, there is no need to divide the voltage using resistors. Thus, such an arrangement does not lead to an increased number of circuit components. That is to say, with the control circuit according to such an embodiment, the output voltage can be monitored with high precision, and the switching control operation can be appropriately performed. In a case in which the wiring line that connects the tap and the switching control unit has been disconnected (open-circuit state) or the tap is short-circuited to the ground or the power supply, the output voltage cannot be controlled. However, by providing the protection circuit, and by monitoring the electric potential at the voltage monitoring terminal, such an arrangement detects an open-circuit state and a short-circuit state, thereby protecting the circuit.

Also, the switching control unit may repeatedly perform an operation cycle comprising: a step in which the switching transistor is set to the ON state during a period before the current that flows through the primary coil of the transformer reaches a predetermined peak current; and a subsequent step in which the switching transistor is switched to the OFF state during an OFF period that corresponds to the monitoring voltage. Also, the protection circuit may monitor the OFF period, and the switching control operation of the switching control unit for the switching transistor may be stopped in a case in which a predetermined condition is satisfied with respect to the OFF period.

As described above, the monitoring voltage that corresponds to the tap voltage is a voltage that corresponds to the output voltage. Thus, such an arrangement is capable of suitably controlling the OFF period of the switching transistor, i.e., the period during which the charging current is supplied to the output capacitor, without degrading precision as compared with an arrangement in which the output voltage that occurs at the output capacitor is directly monitored. In a case in which an open-circuit state or a short-circuit state occurs in the wiring, the monitoring voltage drops, leading to a change in the OFF period. Accordingly, the reduction in the monitoring voltage can be indirectly judged by monitoring the OFF period, thereby providing circuit protection.

Also, the switching control unit may include a maximum OFF time setting circuit which limits the OFF period to a predetermined maximum OFF period or less. Also, the protection circuit may count the number of times the OFF periods are consecutively limited to the maximum OFF period, and the switching control operation of the switching control unit for the switching transistor may be stopped in a case in which the count value exceeds a predetermined threshold value.

By counting the number of times the OFF period is set to the maximum OFF period, such an arrangement is capable of detecting an open-circuit state and a short-circuit state in a sure manner.

Also, the switching control unit may include: a primary current detection circuit which detects the primary current that flows through the primary coil of the transformer; a comparator which compares the primary current detected by the primary current detection circuit with a predetermined peak current value, and outputs a comparison signal which is asserted when the primary current is greater than the peak current value; a first timer which starts counting time when the comparison signal output from the comparator is asserted, and which generates a first set signal which is asserted when an OFF period that corresponds to the monitoring voltage elapses; a second timer which starts counting time when the comparison signal output from the comparator is asserted, and which generates a second set signal which is asserted when a predetermined maximum OFF period elapses; and a switching control unit which sets the switching transistor to the OFF state when the comparison signal is asserted, and which sets the switching transistor to the ON state at an earlier timing selected from a timing at which the first set signal is asserted and a timing at which the second set signal is asserted. Also, the protection circuit may include a counter which counts the number of times the switching transistor is set to the ON state at a timing at which the second set signal is asserted, and may stop the switching control operation of the switching control unit for the switching transistor in a case in which the count value reaches a predetermined value.

Also, the switching control unit may include a full-charge detection unit which detects whether or not charging has been completed, by comparing the monitoring voltage with a predetermined threshold voltage. Also, when full-charge is detected, the switching control unit may stop the ON/OFF operation of the switching transistor.

As described above, the monitoring voltage that corresponds to the tap voltage has a relation with the output voltage. Thus, such an arrangement is capable of detecting whether or not the fully charged state has occurred, and is capable of stopping the switching operation without degrading precision as compared with an arrangement in which the output voltage that occurs at the output capacitor is directly monitored.

Another embodiment of the present invention also relates to a control circuit. The control circuit includes: a voltage monitoring terminal connected to a tap provided to the secondary coil of the transformer; a switching control unit which receives a monitoring voltage that occurs at the voltage monitoring terminal, and which controls the switching operation of the switching transistor according to the monitoring voltage; and a protection circuit which monitors the impedance at the voltage monitoring terminal, and which stops the switching control operation of the switching control unit for the switching transistor in a case in which an abnormal state has been detected.

With the control circuit according to such an embodiment, the output voltage can be monitored with high precision, thereby suitably performing the switching control operation. In a case in which the wiring line that connects the tap and the switching control unit has been disconnected (open-circuited) or the tap is short-circuited to the ground or the power supply, the feedback operation cannot be used, leading to a situation in which the output voltage cannot be controlled. However, by monitoring the impedance at the tap, such an arrangement is capable of detecting the abnormal state of the circuit.

Also, the switching control unit repeatedly may perform an operation cycle comprising: a step in which the switching transistor is set to the ON state during a period before the current that flows through the primary coil of the transformer reaches a predetermined peak current; and a subsequent step in which the switching transistor is switched to the OFF state during an OFF period that corresponds to the monitoring voltage.

Also, the switching control unit may include a full-charge detection unit which detects whether or not charging has been completed, by comparing the monitoring voltage with a predetermined threshold voltage. Also, the switching control unit may stop the ON/OFF operation of the switching transistor when full-charge is detected.

Also, the circuit components may be monolithically integrated on a single semiconductor substrate. Examples of "arrangements monolithically integrated" include: an arrangement in which all the elements of a circuit are formed on a single semiconductor substrate; and an arrangement in which principal elements of a circuit are monolithically integrated. Also, a part of the resistors, capacitors, and so forth, for adjusting circuit constants, may be provided to the semiconductor substrate in the form of external elements.

Yet another embodiment of the present invention relates to a capacitor charging apparatus. The capacitor charging apparatus includes: a transformer which includes a primary coil and a secondary coil, and which is arranged such that an input voltage is applied to one terminal of the primary coil, and the other terminal thereof is connected to a switching transistor; an output capacitor arranged with one terminal thereof grounded; a diode arranged with the anode thereof connected to the secondary coil side of the transformer, and with the cathode thereof connected to the other terminal side of the output capacitor; and a control circuit according to any one of the above-described embodiments, which controls the ON/OFF operation of the switching transistor.

Yet another embodiment of the present invention relates to a light emitting device. The light emitting device includes: the above-described capacitor charging apparatus; and a light emitting element which is driven using the output voltage that occurs at an output capacitor of the capacitor charging apparatus.

Yet another embodiment of the present invention relates to an electronic apparatus. The electronic apparatus includes:

the above-described light emitting device; and a control unit which controls the light emission state of the light emitting device.

Yet another embodiment of the present invention relates to a control method for controlling a capacitor charging apparatus which includes a transformer and an output capacitor which is charged with electric current that flows through a secondary coil of the transformer, and which charges the output capacitor by controlling the switching operation of a switching transistor provided on a path of a primary coil of the transformer. In this method, the following steps 1 through 5 are repeatedly performed: a step 1 for detecting a primary current that flows through the primary coil of the transformer; a step 2 for setting the switching transistor to the ON state during a period before the primary current thus detected reaches a predetermined peak current value; a step 3 for setting an OFF period based upon a monitoring voltage that corresponds to the voltage at a tap provided to the secondary coil of the transformer; a step 4 for limiting the OFF period to a predetermined maximum OFF period or less; and a step 5 for setting the switching transistor to the OFF state during the OFF period thus set. Furthermore, in this method, a protection step is executed, in which, in a case in which the monitoring voltage continues to be smaller than a predetermined threshold value for a predetermined period, the switching control operation for the switching transistor is stopped.

Also, in the protection step, the number of times the OFF period is limited to the maximum OFF period may be counted. Also, in a case in which the count value has exceeded a predetermined threshold value, the switching control operation for the switching transistor may be stopped.

Yet another embodiment of the present invention also relates to a control method for controlling a capacitor charging apparatus. In this control method, the above-described steps 1 through 5 are repeatedly performed. Furthermore, an additional step is further executed in which the impedance is monitored at the terminal to be connected to the tap, and in a case in which an abnormal state has been detected, the switching control operation for the switching transistor is stopped.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B. In the same way, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

Figure 1:
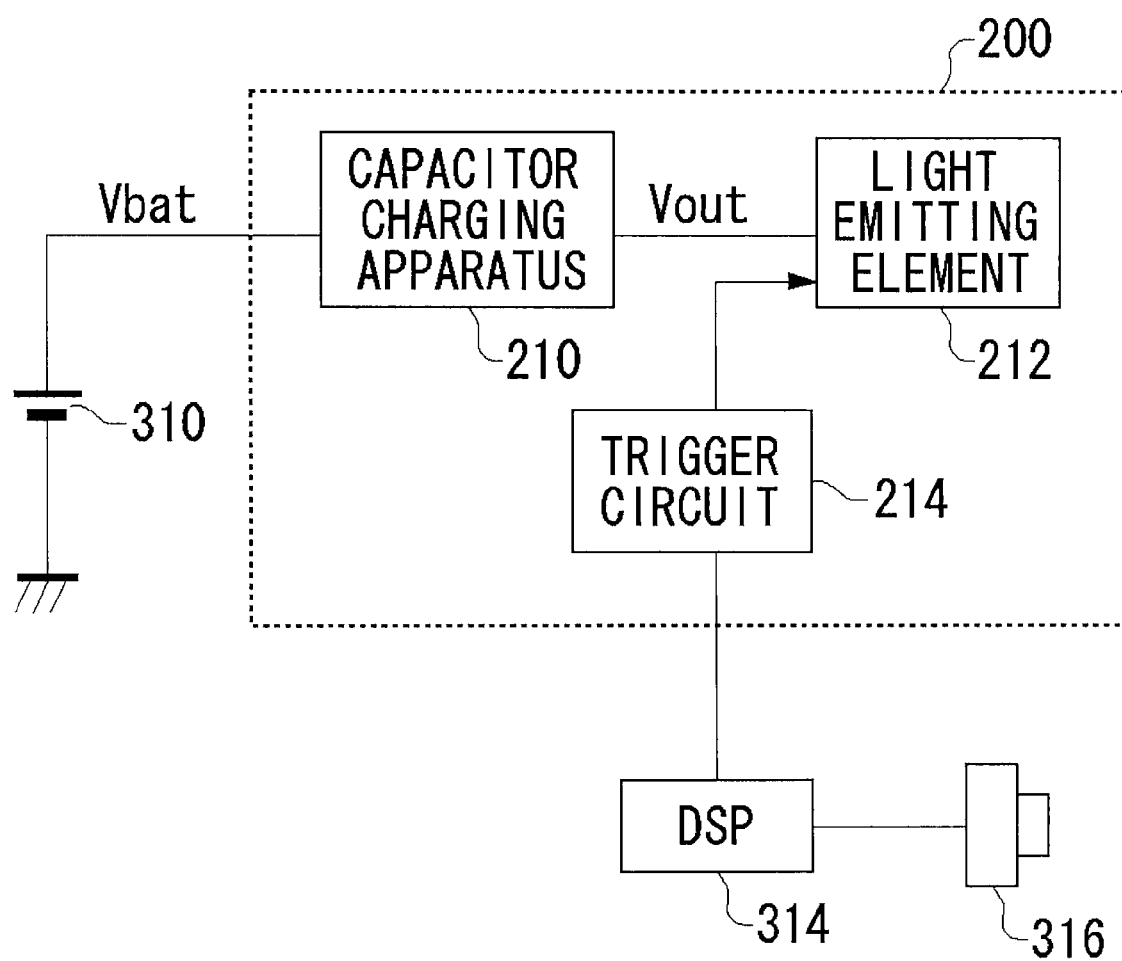
FIG. 1 is a block diagram which shows a configuration of an electronic apparatus mounting a light emitting device according to an embodiment.

FIG. 1 is a block diagram which shows a configuration of an electronic apparatus 300 mounting a light emitting device 200 according to an embodiment. The electronic apparatus 300 is a cellular phone terminal having a image acquisition function, a digital still camera, a digital video camera or the like. The electronic apparatus 300 includes a battery 310, a DSP (digital Signal Processor) 314, an image acquisition unit 316, and the light emitting device 200.

The battery 310 is a lithium ion battery, for example, and outputs a battery voltage of around 3 to 4 V as a battery voltage Vbat. The DSP 314 is a block for centrally controlling the overall operation of the electronic device 300, and is connected to the image acquisition unit 316 and the light emitting device 200. The image acquisition unit 316 is an image acquisition device such as a CCD (Charge Coupled Device), a CMOS sensor, or the like. The light emitting device 200 is used as a flash when the image acquisition unit 316 acquires an image.

The light emitting device 200 includes a capacitor charging apparatus 210, a light emitting element 212, and a trigger circuit 214. A xenon tube or the like is suitably employed as the light emitting element 212. The capacitor charging apparatus 210 boosts the battery voltage Vbat supplied from the battery 310 by charging the output capacitor provided at the output thereof, and supplies the driving voltage of around 300 V to the light emitting element 212. The trigger circuit 214 is a circuit which controls the timing of the light emitting operation of the light emitting device 200. The light emitting element 212 performs light emission synchronously with the image acquisition operation of the image acquisition unit 316.

Figure 2:
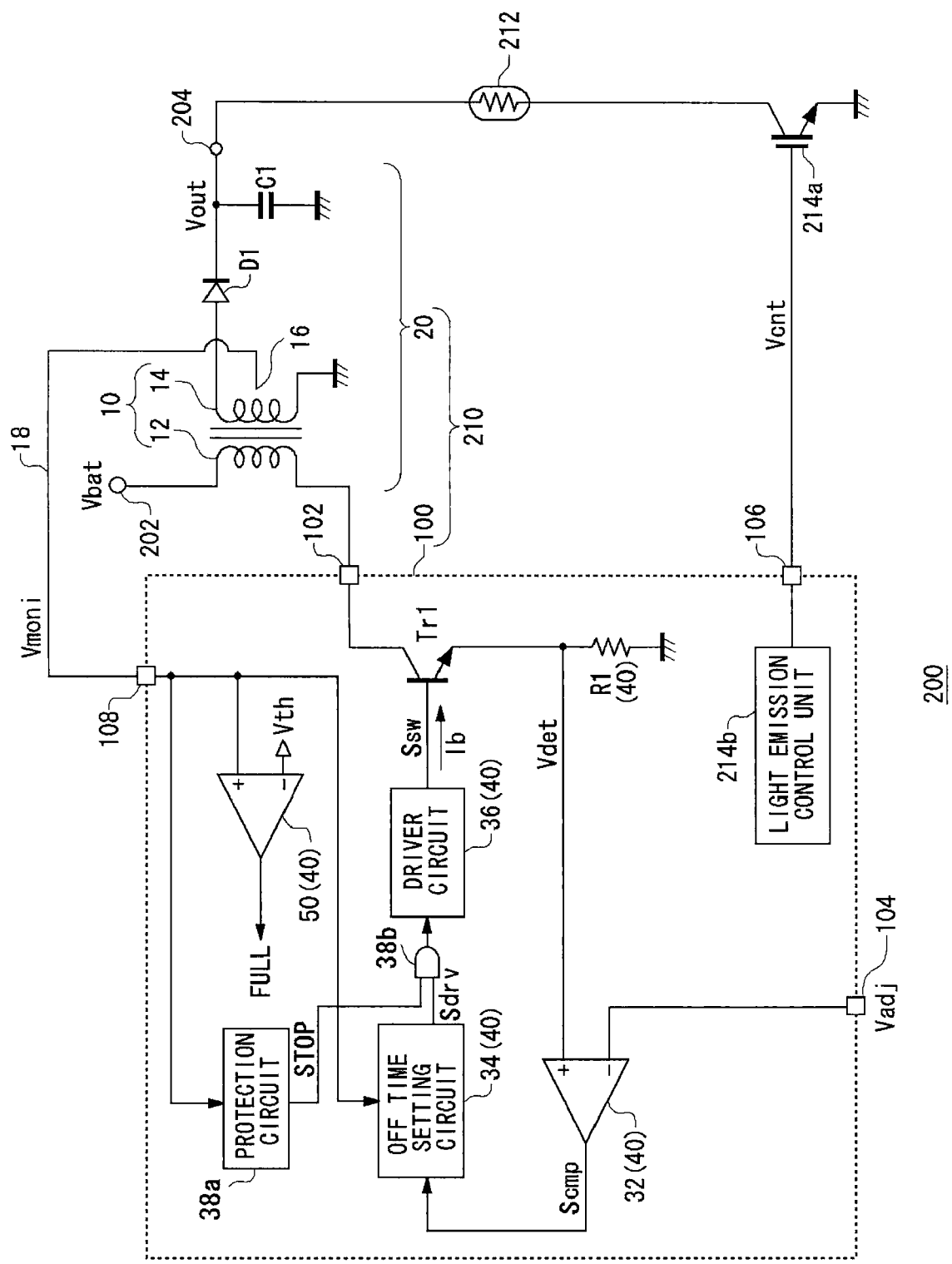
FIG. 2 is a circuit diagram which shows a configuration of a light emitting device according to the embodiment.

FIG. 2 is a circuit diagram which shows a configuration of the light emitting device 200. The light emitting device 200 includes the capacitor charging apparatus 210, the light emitting element 212, and an IGBT 214a. A control circuit 100, a switching transistor Tr, a transformer 10, a rectifier diode D1, and an output capacitor C1 shown in FIG. 2 correspond to the capacitor charging apparatus 210 shown in FIG. 1. Furthermore, the trigger circuit 214 shown in FIG. 1 corresponds to the IGBT 214a and a light emission control unit 214b.

The capacitor charging apparatus 210 supplies a charging electric current to the output capacitor C1 so as to generate a driving voltage (which will also be referred to as the "output voltage Vout" hereafter) sufficient for the light emission operation of the light emitting element 212. The capacitor charging apparatus 210 has a configuration including an output circuit 20 and the control circuit 100.

The output circuit 20 includes the transformer 10, the rectifier diode D1, and the output capacitor C1. The transformer 10 includes a primary coil 12 and a secondary coil 14. One terminal of the primary coil 12 is used as an input terminal 202 of the capacitor charging apparatus 210, to which the battery voltage Vbat output from the battery 310 shown in FIG. 1 is applied. The other terminal of the primary coil 12 is connected to a switching terminal 102 of the control circuit 100.

One terminal of the secondary coil 14 of the transformer 10 is grounded such that it is set to a fixed electric potential. The other terminal thereof is connected to the anode of the rectifier diode D1. One terminal of the output capacitor C1 is grounded, and the other terminal thereof is connected to the cathode of the rectifier diode D1. One terminal of the output capacitor C1 is used as an output terminal 204 of the capacitor charging apparatus 210, via which the voltage charged in the output capacitor C1 is output as the output voltage Vout.

In the present embodiment, a tap 16 is provided to the secondary coil 14 of the transformer 10. The voltage at the tap 16 (which will be referred to as the "monitoring voltage Vmoni" hereafter) is input to a voltage monitoring terminal 108 of the control circuit 100 via a line 18. The control circuit 100 controls the ON/OFF operation of the switching transistor Tr1 according to the monitoring voltage Vmoni regarded as the output voltage Vout. The voltage monitoring terminal 108 and the line 18 extending to the tap 16 provide a function as a voltage detection unit which monitors the voltage at the tap 16.

The control circuit 100 instructs the transformer 10 to store energy by performing the switching control operation for the ON/OFF operation of the switching transistor Tr1, and generates a charging current for the output capacitor C1, thereby boosting the battery voltage Vout. Hereafter, the current that flows through the primary coil 12 will be referred to as the "primary current Ic1", and the current that flows through the secondary coil 14 will be referred to as the "secondary current Ic2".

The control circuit 100 includes a detection resistor R1, a comparator 32, an OFF time setting circuit 34, a driver circuit 36, a protection circuit 38, a light emission control unit 214b, and a full-charge detection circuit 50, in addition to the switching transistor Tr1. The control circuit 100 is monolithically integrated on a single semiconductor substrate as a function IC.

The control circuit 100 controls the ON/OFF operation by controlling the voltage or current to be supplied to the control terminal of the switching transistor Tr1. In the present embodiment, the switching transistor Tr1 is a bipolar transistor. The collector of the switching transistor Tr1 is connected to the primary coil 12 of the transformer 10 via the switching terminal 102. The driver circuit 36 performs switching control of the base current Ib of the switching transistor Tr1.

The detection resistor R1, the comparator 32, the OFF time setting circuit 34, the driver circuit 36, and the full-charge detection circuit 50 provide a function as a switching control unit 40 which controls the switching operation of the switching transistor Tr1. In the switching control unit 40, the monitoring voltage Vmoni is regarded as the output voltage Vout of the capacitor charging apparatus 210 in order to control the ON/OFF operation of the switching transistor Tr1. Specifically, according to the monitoring voltage Vmoni, the switching control unit 40 performs one of (or otherwise both of) the following: (1) adjusting the duty ratio of the ON/OFF periods of the switching transistor Tr1; (2) stopping the switching operation of the switching transistor Tr1 when the capacitor is in the fully charged state. Description will be made below regarding an arrangement in which both (1) and (2) are performed. However, a circuit which performs either (1) or (2) is also encompassed within the scope of the present invention.

The detection resistor R1 provides a function as a primary current detection circuit which detects the primary current Ic1 that flows through the primary coil 12 of the transformer 10. The detection resistor R1 is provided on the same path as the primary coil 12 that flows through the primary current Ic1 and the switching transistor Tr1. The detection resistor R1 is arranged with one terminal grounded, and the other terminal connected to the emitter of the switching transistor Tr1. The voltage drop Vdet=Ic1×R1, which is proportional to the primary current Ic1, occurs at the detection resistor R1. The detection resistor R1 outputs the detection voltage Vdet that corresponds to the primary current Ic1.

A current adjustment signal Vadj, which denotes the charging current that flows into the output capacitor C1, is input from an external circuit to a charging current control terminal 104 of the control circuit 100. The comparator 32 compares the detection voltage Vdet output from the primary current detection circuit with the current adjustment signal Vadj. In a case in which the detection voltage Vdet is greater than the current adjustment signal Vadj, i.e., in a case in which the comparator 32 has detected that the primary current Ic1 has reached a predetermined current value (which will be referred to as the "peak current value Ipeak" hereafter) which is determined according to the current adjustment signal Vadj, the comparator 32 sets a comparison signal Scmp to the high-level state (asserted state). The comparison signal Scmp output from the comparator 32 is input to the OFF time setting circuit 34. As described later, the current adjustment signal Vadj is a signal which defines the peak value Ipeak of the charging current. The relation between the peak current value Ipeak and the current adjustment signal Vadj is represented by the following Expression: Ipeak=Vadj/R1.

The OFF time setting circuit 34 counts a predetermined OFF period Toff after the comparison signal Scmp is asserted, and generates a driving signal Sdrv at a first level (e.g., in the low-level state) during the OFF period Toff.

The driver circuit 36 stops the supply of the base current to the switching transistor Tr1 when the driving signal Sdrv is at the first level, i.e., when the OFF time setting circuit 34 is counting the OFF period Toff, thereby stopping the operation of the switching transistor Tr1. When the driving signal Sdrv is returned to the second level (e.g., high level) after the the OFF period Toff elapses, the driver circuit 36 supplies the base current to the switching transistor Tr1, thereby switching the switching transistor Tr1 to the ON state again.

During the period of time before the primary current Ic1 reaches the predetermined peak current value Ipeak, the switching control unit 40 instructs the switching transistor Tr1 to maintain the ON state. Subsequently, during a certain OFF period Toff, the switching control unit 40 outputs, to the base of the switching transistor Tr1, a switching signal Ssw which sets the switching transistor Tr1 to the OFF state.

It should be noted that the OFF period Toff may be set beforehand, or may be set according to the output voltage Vout. Also, the OFF period Toff may be set according to the state of the primary line of the transformer 10 or the state of the secondary line thereof. Also, the OFF period Toff may be set according to the monitoring voltage Vmoni, as described later.

The driver circuit 36 of the switching control unit 40 receives, as an input signal, the current adjustment signal Vadj which denotes the charging current. The driver circuit 36 adjusts the switching signal, which is output to the base of the switching transistor Tr1, according to the current adjustment signal Vadj. Specifically, the switching control unit 40 adjusts the current value of the base current Ib, which is output to the base of the switching transistor Tr1 as a switching signal, according to the current adjustment signal Vadj.

The full-charge detection circuit 50 is a comparator. In the full-charge detection circuit 50, the monitoring voltage Vmoni that occurs at the tap 16 provided to the secondary coil 14 of the transformer 10 is regarded as the output voltage Vout that occurs at the output capacitor C1, and the monitoring voltage Vmoni is compared with a predetermined threshold voltage Vth so as to detect whether or not charging has been completed. The threshold voltage Vth is set to a voltage which is sufficient for the light emission operation of the light emitting element 212, e.g., a voltage of around 300 V. When the full-charge detection circuit 50 detects charging completion, the full-charge detection circuit 50 asserts a flag FULL which indicates the charging completion state. When the full-charge detection circuit 50 detects the charging completion state, the switching control unit 40 stops the switching operation of the switching transistor Tr1.

Furthermore, in the present embodiment, the monitoring voltage Vmoni input to the voltage monitoring terminal 108 is input to the OFF time setting circuit 34 of the switching control unit 40. The OFF time setting circuit 34 changes the OFF period Toff, during which the switching transistor Tr1 is maintained in the OFF state, according to the monitoring voltage Vmoni.

For example, the OFF time setting circuit 34 may reduce the OFF period Toff according to an increase in the monitoring voltage Vmoni, i.e., an increase in the output voltage Vout. In a case in which the OFF time setting circuit 34 is configured as a CR time constant circuit in which a capacitor is charged and discharged, the OFF period Toff can be adjusted by changing the discharge current according to the monitoring voltage Vmoni.

With such an arrangement in which the switching control unit 40 controls the switching transistor Tr1 according to the monitoring voltage Vmoni, in a case in which the line 18 that connects the voltage monitoring terminal 108 and the tap 16 has been disconnected (open circuit state), grounded, or short-circuited to the power supply (short circuit state), there is no relation between the monitoring voltage Vmoni and the output voltage Vout. In a case in which detection of the fully charged state is performed based upon the monitoring voltage Vmoni in such a circuit malfunction state, a problem occurs in that the charging operation is not stopped after the output voltage Vout exceeds the threshold voltage Vth. Furthermore, in a case in which the OFF period Toff is changed based upon the monitoring voltage Vmoni, the OFF period Toff is set to a value which has no relation with the output voltage Vout. Accordingly, such an arrangement leads to a problem of excessive or insufficient charging time for the output capacitor C1.

In order to solve such problems, in a case in which the monitoring voltage Vmoni is maintained below a predetermined threshold for a predetermined period of time, protection circuits 38a and 38b stop the switching control operation of the switching control unit 40 for the switching transistor Tr1. The protection circuit 38a generates a stop signal STOP which is set to a low-level state (asserted) during a period in which the switching control operation is to be stopped. The AND gate 38b outputs the logical AND of the stop signal STOP and the driving signal Sdrv to the driver circuit 36. It should be noted that, for the purpose of stopping the switching operation, other techniques may be employed, instead of a method in which the logical value of the driving signal Sdrv is set to a fixed value using the AND gate 38b. Also, several circuit blocks may be shut down, in addition to the switching operation being stopped.

Next, description will be made regarding a specific example configuration of the protection circuits 38a and 38b.

(First Example Configuration)

Figure 3:
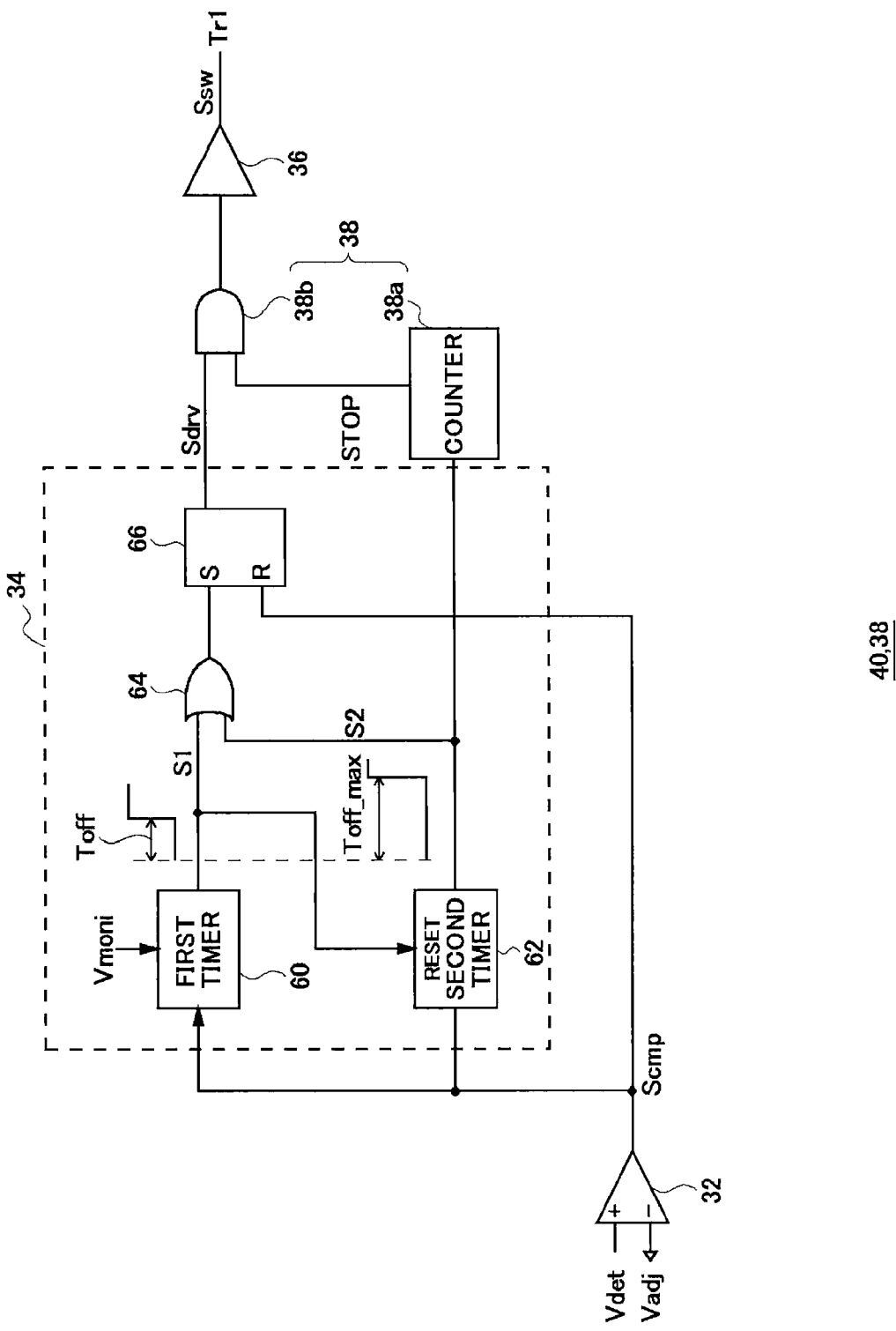
FIG. 3 is a block diagram which shows a first example configuration of a switching control unit and a protection circuit.

FIG. 3 is a block diagram which shows a first example configuration of the switching control unit 40 and the protection circuit 38.

The OFF time setting circuit 34 includes a first timer 60, a second timer 62, an OR gate 64, and an SR flip-flop 66.

The first timer 60 times the OFF period Toff which is set according to the monitoring voltage Vmoni. The first timer 60 receives the comparison signal Scmp from the comparator 32, and generates a first set signal S1 which is set to the high-level state (asserted) after the OFF period Toff elapses after the comparison signal Scmp has been asserted.

The second timer 62 and the OR gate 64 provide a function as a maximum OFF time setting circuit which limits the OFF period Toff to a predetermined maximum OFF period Toff_max or less.

When the comparison signal Scmp is asserted, the second timer 62 starts counting time, and generates a second set signal S2 which is set to the high-level state (asserted) after the predetermined maximum OFF period Toff_max elapses. The OR gate 64 generates the logical OR of the first set signal S1 and the second set signal S2, and outputs the logical OR thus generated to the set terminal of the SR flip-flop 66.

The comparison signal Scmp is input to the reset terminal of the SR flip-flop 66. The output of the SR flip-flop 66 is output to the driver circuit 36 as the driving signal Sdrv.

That is to say, when the comparison signal Scmp is asserted, the switching control unit 40 switches the switching transistor Tr1 to the OFF state. Furthermore, at an earlier timing, selected from the timing at which the first set signal S1 is switched to the high-level state (asserted) and the timing at which the second set signal S2 is switched to the high-level state (asserted), the switching control unit 40 switches the switching transistor Tr1 to the ON state.

The protection circuit 38 includes an abnormal state detection circuit 38a and an AND gate 38b. The abnormal state detection circuit 38a is a counter which counts the number of times the OFF period Toff is consecutively limited to the maximum OFF period Toff_max. The abnormal state detection circuit 38a generates the stop signal STOP which is switched to the low-level state (asserted) in a case in which the count value has exceeded a predetermined threshold value N (N is an integer). That is to say, in a case in which the switching transistor Tr1 repeatedly performs the ON/OFF operation consecutively N times with a duty ratio that corresponds to the maximum OFF period Toff_max, the AND gate 38b generates the logical AND of the stop signal STOP and the driving signal Sdrv, and supplies the logical AND thus generated to the driver circuit 36. In a case in which the stop signal STOP has been asserted, the logical value of the driving signal Sdrv is set to a fixed value, thereby stopping the switching control operation of the switching control unit 40 for the switching transistor Tr1.

The second timer 62 includes a reset terminal, via which the first set signal S1 is input. When the first set signal S1 is switched to the high-level state, the second timer 62 is reset. In a case in which the maximum OFF period Toff_max has elapsed before the second timer 62 is reset according to the first set signal S1, the second set signal S2 is switched to the high-level state. Accordingly, in a case in which the OFF period Toff has been limited to the maximum OFF period Toff_max, the second set signal S2 is switched to the high-level state. The abnormal state detection circuit 38a counts the number of times the OFF period Toff has been limited to the maximum OFF period Toff_max by counting the second set signal S2.

The switching control unit 40 and the protection circuit 38 shown in FIG. 3 are capable of indirectly detecting whether or not the monitoring voltage Vmoni is smaller than the threshold voltage by monitoring the length of the OFF period Toff. Such an arrangement is capable of protecting the circuit in a case in which an open-circuit state or a short-circuit state has occurred at the line 18.

(Second Embodiment)

Description has been made in the first example configuration regarding an arrangement in which the circuit is protected by monitoring the OFF period Toff. Instead of such a method, in the second example configuration, detection is made whether or not an open-circuit state or a short-circuit state has occurred at the line 18 by comparing the monitoring voltage Vmoni with a threshold voltage. In this case, the protection circuit 38 comprises a comparator which compares the monitoring voltage Vmoni with a threshold voltage and a timer circuit which times a predetermined period of time according to the output signal of the comparator.

In a case in which the line 18 is in the open state or the grounded state, the monitoring voltage Vmoni is reduced down to the ground electric potential. Accordingly, such a circuit malfunction can be detected by comparing the monitoring voltage Vmoni with a low threshold voltage of around 0 V. Additionally, in a case in which the line 18 has been short-circuited to the power supply, the monitoring voltage Vmoni rises up to around the power supply voltage. Accordingly, the short-circuit state can be detected by comparing the monitoring voltage Vmoni with another threshold voltage.

It should be noted that, in the second example configuration, there is a need to provide a comparator for each threshold voltage. However, with the first example configuration, there is no need to provide a comparator which compares the monitoring voltage Vmoni in order to detect the short-circuit state or the like at the line 18, thereby providing a simple circuit configuration.

(Third Embodiment)

The protection circuit 38 may monitor the impedance at the voltage monitoring terminal 108, instead of monitoring the monitoring voltage Vmoni. When the line 18 is connected to the tap 16 in the normal state, the impedance on the line 18 side measured via the voltage monitoring terminal 108 matches the impedance across the tap 16 provided to the secondary coil 14 and the ground terminal. In a case in which an open-circuit state or a short-circuit state has occurred at the line 18, the impedance changes. The protection circuit 38 may detect the change in the impedance.

The above is an example configuration of the protection circuit 38 and the switching control unit 40.

Returning to FIG. 2, the light emission control unit 214b generates a light emission control signal Vcnt so as to control the base voltage of the IGBT 214a connected to a light emission control terminal 106. When the light emission control signal Vcnt is switched to the high-level state in the state in which sufficient driving voltage Vout has been generated after charging of the output capacitor C1 has been completed, the IGBT 214a is switched to the ON state, thereby instructing the light emitting element 212 to emit light.

Figure 4:
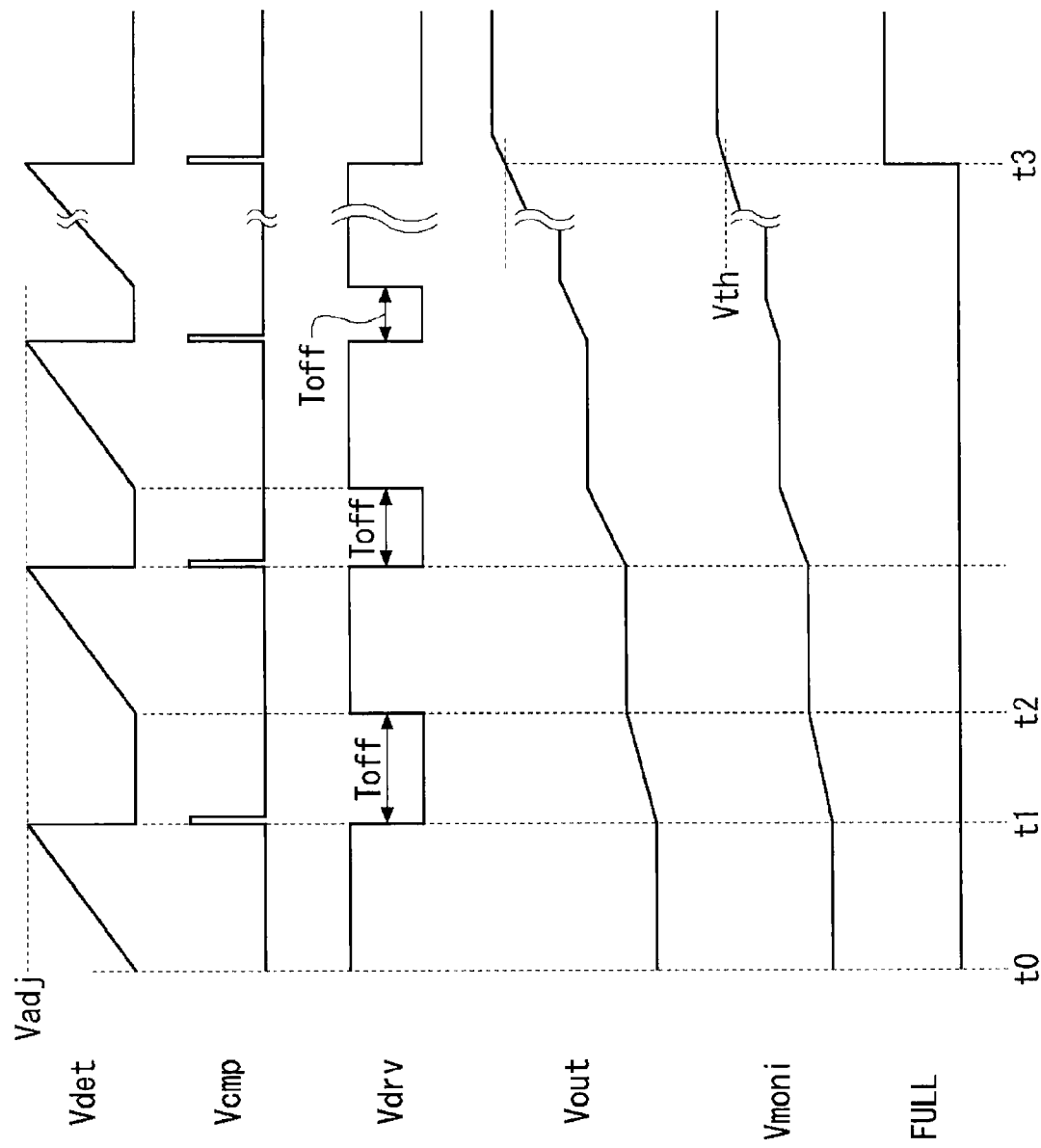
FIG. 4 is a time chart which shows the operation of the capacitor charging apparatus shown in FIG. 2.

Description will be made regarding the operation of a light emitting device 200 having such a configuration. FIG. 4 is a time chart which shows the operation of the capacitor charging apparatus 210 according to the embodiment. The vertical axis and the horizontal axis shown in FIG. 4 are expanded or reduced as appropriate to facilitate understanding. Furthermore, each waveform has been simplified to facilitate understanding. At the point in time t0, the switching signal Ssw is switched to the high-level state. That is to say, the base current Ib is supplied to the switching transistor Tr1, thereby switching the switching transistor Tr1 to the ON state. After the switching transistor Tr1 has been switched to the ON state, the primary current Ic1 that flows through the primary coil of the transformer 10 gradually increases according to the passage of time. At the point in time t1, Vdet exceeds Vadj.

When Vdet exceeds Vadj, the comparison signal Scmp output from the comparator 32 switches from the low-level state to the high-level state. The OFF time setting circuit 34 sets the driving signal Sdrv to the first level (low level) during the OFF period Toff after the comparison signal Scmp has been switched to the high-level state. The driver circuit 36 stops the supply of the base current Ib to the switching transistor Tr1 so as to set the switching transistor Tr1 to the OFF state during the period in which the driving signal Sdrv is in the low-level state. After the switching transistor Tr1 has been switched to the OFF state, the output capacitor C1 is charged with the secondary current Ic2 that flows through the secondary coil 14.

At the point in time t2 after the OFF period Toff elapses after the point in time t1, the driving signal Sdrv is switched to the high-level state. When the driving signal Sdrv is switched to the high-level state, the driver circuit 36 supplies the base current Ib to the switching transistor Tr1. The control circuit 100 repeatedly performs an operation cycle comprising the operation steps from the point in time t0 to t2, so as to charge the output capacitor C1, thereby raising the output voltage Vout.

The OFF period Toff set by the OFF time setting circuit 34 is determined according to the monitoring voltage Vmoni. Accordingly, the OFF period Toff is gradually reduced according to an increase in the monitoring voltage Vmoni, i.e., an increase in the output voltage Vout. As a result, such an arrangement is capable of sufficiently using the energy stored in the transformer 10 when the output voltage Vout is low immediately after the start of the charging operation. Furthermore, such an arrangement is capable of raising the charging rate according to an increase in the output voltage Vout, thereby providing an appropriate balance between efficiency and charging rate.

At the point in time t3, when the monitoring voltage Vmoni reaches the threshold voltage Vth, the full-charge detection circuit 50 asserts the flag FULL which indicates charging completion, which permits the light emitting element 212 to emit light. When the monitoring voltage Vmoni rises up to a desired voltage value, the light emission control unit 214b switches the light emission control signal Vcnt synchronously with image acquisition performed by the image acquisition unit 316 shown in FIG. 1. As a result, the IGBT 214a is switched to the ON state, whereupon a xenon lamp which is employed as the light emitting element 212 emits light as a flash.

With the capacitor charging apparatus 210 according to the present embodiment, a tap is provided to the secondary coil 14 of the transformer 10, and the electric potential at the tap is monitored, thereby allowing the voltage that corresponds to the output voltage Vout that occurs at the output capacitor C1 to be detected with high precision. Furthermore, the tap 16 is provided at a position on the ground side of the secondary coil 14, i.e., the lower-voltage side thereof. Accordingly, there is no need to divide the voltage using resistors. Thus, such an arrangement does not lead to an increased number of circuit components. The control circuit 100 is capable of suitably controlling the switching operation of the switching transistor Tr1 according to the monitoring voltage Vmoni that corresponds to the output voltage Vout.

For example, in the embodiment, the full-charge detection circuit 50 detects the charging state based upon the monitoring voltage Vmoni. In this case, such an arrangement is capable of detecting whether or not the fully charged state has occurred, and is capable of stopping the switching operation without degrading precision as compared with an arrangement in which the output voltage Vout that occurs at the output capacitor C1 is directly monitored. As a result, such an arrangement solves a problem that the voltage necessary for driving the load cannot be obtained. Furthermore, such an arrangement also solves a problem that the output capacitor C1 can be overcharged.

Furthermore, in the present embodiment, the OFF period Toff set for the OFF time setting circuit 34 is determined based upon the monitoring voltage Vmoni. As a result, the switching operation is performed with high precision according to the output voltage.

The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention.

Description has been made in the embodiment regarding an arrangement in which a bipolar transistor is employed as the switching transistor Tr1. Also, a MOSFET may be employed as the switching transistor Tr1. Description has been made in the embodiment regarding an arrangement in which the timing of the ON/OFF operation of the switching transistor Tr1 is determined based upon the primary current Ic1. However, the control method is not restricted to such an arrangement. Also, other control methods may be employed.

Description has been made in the embodiment regarding an arrangement in which the capacitor charging apparatus 210 drives the light emitting element 212. However, the usage of the capacitor charging apparatus 210 is not restricted to such an arrangement. Also, the capacitor charging apparatus 210 may drive various kinds of load circuits which require high voltage.

Also, in the present embodiment, the settings of the high level and the low level logical values have been described for exemplary purposes only. The settings may be modified as desired, using an inverter for inverting a signal, etc., as appropriate.

While the preferred embodiments of the present invention have been described using specific terms, such description is for illustrative purposes only, and it is to be understood that changes and variations may be made without departing from the spirit or scope of the appended claims.

What is claimed is:

1. A control circuit for a capacitor charging apparatus which comprises a transformer having a primary coil, a secondary coil and a tap provided on the secondary coil, and an output capacitor which is charged with electric current that flows through the secondary coil of the transformer, and which charges the output capacitor by controlling the switching operation of a switching transistor provided on a path of the primary coil of the transformer, the control circuit comprising:
a voltage monitoring terminal connected to the tap provided to the secondary coil of the transformer;
a switching control unit which receives a monitoring voltage that occurs at the voltage monitoring terminal, and which controls the switching operation of the switching transistor according to the monitoring voltage; and
a protection circuit which monitors the monitoring voltage, and which stops the switching control operation of the switching control unit for the switching transistor in a case in which a predetermined condition continues to be satisfied with respect to the monitoring voltage for a predetermined period of time;
wherein the switching control unit comprises:
a primary current detection circuit which detects the primary current that flows through the primary coil of the transformer;
a comparator which compares the primary current detected by the primary current detection circuit with a predetermined peak current value, and outputs a comparison signal which is asserted when the primary current is greater than the peak current value;
a first timer which starts counting time when the comparison signal output from the comparator is asserted, and which generates a first set signal which is asserted when an OFF period that corresponds to the monitoring voltage elapses;
a second timer which starts counting time when the comparison signal output from the comparator is asserted, and which generates a second set signal which is asserted when a predetermined maximum OFF period elapses; and
a switching control unit which sets the switching transistor to the OFF state when the comparison signal is asserted, and which sets the switching transistor to the ON state at an earlier timing selected from a timing at which the first set signal is asserted and a timing at which the second set signal is asserted,
and wherein the protection circuit includes a counter which counts the number of times the switching transistor is set to the ON state at a timing at which the second set signal is asserted, and stops the switching control operation of the switching control unit for the switching transistor in a case in which the count value reaches a predetermined value.

2. A control circuit according to claim 1, wherein the switching control unit repeatedly performs an operation cycle comprising: a step in which the switching transistor is set to the ON state during a period before the current that flows through the primary coil of the transformer reaches a predetermined peak current; and a subsequent step in which the switching transistor is switched to the OFF state during an OFF period that corresponds to the monitoring voltage,
and wherein the protection circuit monitors the OFF period, and the switching control operation of the switching control unit for the switching transistor is stopped in a case in which a predetermined condition is satisfied with respect to the OFF period.

3. A control circuit according to claim 2, wherein the switching control unit comprises a maximum OFF time setting circuit which limits the OFF period to a predetermined maximum OFF period or less,
and wherein the protection circuit counts the number of times the OFF periods are consecutively limited to the maximum OFF period, and the switching control operation of the switching control unit for the switching transistor is stopped in a case in which the count value exceeds a predetermined threshold value.

4. A control circuit according to claim 1, wherein the switching control unit comprises a charging completion detection unit which detects whether or not charging has been completed, by comparing the monitoring voltage with a predetermined threshold voltage, and wherein, when charging completion is detected, the switching control unit stops the ON/OFF operation of the switching transistor.

5. A control circuit for a capacitor charging apparatus which comprises a transformer and an output capacitor which is charged with electric current that flows through a secondary coil of the transformer, and which charges the output capacitor by controlling the switching operation of a switching transistor provided on a path of a primary coil of the transformer, comprising:

a voltage monitoring terminal connected to a tap provided to the secondary coil of the transformer;

a switching control unit which receives a monitoring voltage that occurs at the voltage monitoring terminal, and which controls the switching operation of the switching transistor according to the monitoring voltage; and a protection circuit which monitors the impedance at the voltage monitoring terminal, and which stops the switching control operation of the switching control unit for the switching transistor in a case in which an abnormal state has been detected;

wherein the switching control unit comprises:

a primary current detection circuit which detects the primary current that flows through the primary coil of the transformer;

a comparator which compares the primary current detected by the primary current detection circuit with a predetermined peak current value, and outputs a comparison signal which is asserted when the primary current is greater than the peak current value;

a first timer which starts counting time when the comparison signal output from the comparator is asserted, and which generates a first set signal which is asserted when an OFF period that corresponds to the monitoring voltage elapses;

a second timer which starts counting time when the comparison signal output from the comparator is asserted, and which generates a second set signal which is asserted when a predetermined maximum OFF period elapses; and a switching control unit which sets the switching transistor to the OFF state when the comparison signal is asserted, and which sets the switching transistor to the ON state at an earlier timing selected from a timing at which the first set signal is asserted and a timing at which the second set signal is asserted, and wherein the protection circuit includes a counter which counts the number of times the switching transistor is set to the ON state at a timing at which the second set signal is asserted, and stops the switching control operation of the switching control unit for the switching transistor in a case in which the count value reaches a predetermined value.

6. A control circuit according to claim 5, wherein the switching control unit repeatedly performs an operation cycle comprising: a step in which the switching transistor is set to the ON state during a period before the current that flows through the primary coil of the transformer reaches a predetermined peak current; and a subsequent step in which the switching transistor is switched to the OFF state during an OFF period that corresponds to the monitoring voltage.

7. A control circuit according to claim 5, wherein the switching control unit comprises a charging completion detection unit which detects whether or not charging has been completed, by comparing the monitoring voltage with a predetermined threshold voltage, and wherein the switching control unit stops the ON/OFF operation of the switching transistor when charging completion is detected.

8. A control circuit according to claim 1, wherein the circuit components are monolithically integrated on a single semiconductor substrate.

9. A capacitor charging apparatus comprising:

a transformer which comprises a primary coil, a secondary coil and a tap provided on the secondary coil, and which is arranged such that an input voltage is applied to one terminal of the primary coil, and the other terminal thereof is connected to a switching transistor;

an output capacitor arranged with one terminal thereof grounded, the output capacitor being charged with electric current that flows through the secondary coil of the transformer;

a diode arranged with the anode thereof connected to the secondary coil side of the transformer, and with the cathode thereof connected to the other terminal side of the output capacitor; and a control circuit configured to control the switching operation of the switching transistor, wherein the control circuit comprises:

a voltage monitoring terminal connected to the tap provided to the secondary coil of the transformer;

a switching control unit which receives a monitoring voltage that occurs at the voltage monitoring terminal, and which controls the switching operation of the switching transistor according to the monitoring voltage; and a protection circuit which monitors the monitoring voltage, and which stops the switching control operation of the switching control unit for the switching transistor in a case in which a predetermined condition continues to be satisfied with respect to the monitoring voltage for a predetermined period of time wherein the switching control unit comprises:

a primary current detection circuit which detects the primary current that flows through the primary coil of the transformer;

a comparator which compares the primary current detected by the primary current detection circuit with a predetermined peak current value, and outputs a comparison signal which is asserted when the primary current is greater than the peak current value;

a first timer which starts counting time when the comparison signal output from the comparator is asserted, and which generates a first set signal which is asserted when an OFF period that corresponds to the monitoring voltage elapses;

a second timer which starts counting time when the comparison signal output from the comparator is asserted, and which generates a second set signal which is asserted when a predetermined maximum OFF period elapses; and a switching control unit which sets the switching transistor to the OFF state when the comparison signal is asserted, and which sets the switching transistor to the ON state at an earlier timing selected from a timing at which the first set signal is asserted and a timing at which the second set signal is asserted, and wherein the protection circuit includes a counter which counts the number of times the switching transistor is set to the ON state at a timing at which the second set signal is asserted, and stops the switching control operation of the switching control unit for the switching transistor in a case in which the count value reaches a predetermined value.

10. A light emitting device comprising:

a capacitor charging apparatus according to claim 9; and a light emitting element which is driven using the output voltage that occurs at an output capacitor of the capacitor charging apparatus.

11. An electronic apparatus comprising:

a light emitting device according to claim 10; and a control unit which controls the light emission state of the light emitting device.

\* \* \* \* \*